US009038765B2

(12) United States Patent
Goujon et al.

(10) Patent No.: US 9,038,765 B2
(45) Date of Patent: May 26, 2015

(54) NEUTRALLY-BUOYANT BOREHOLE INVESTIGATION TOOLS AND METHODS

(71) Applicant: Schlumberger Technology Corporation, Sugar Land, TX (US)

(72) Inventors: Nicolas Goujon, Oslo (NO); Julian Edward Kragh, Essex (GB); Philip A. F. Christie, Cambridgeshire (GB); Emmanuel Coste, Oslo (NO); Clement Kostov, Montigny-le-Bretonneux (FR); Oeyvind Teigen, Slependen (NO); Toru Ikegami, Machida (JP); Marwan Charara, Moscow (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 13/909,060

(22) Filed: Jun. 3, 2013

(65) Prior Publication Data
US 2013/0343157 A1     Dec. 26, 2013

Related U.S. Application Data

(60) Provisional application No. 61/664,685, filed on Jun. 26, 2012.

(51) Int. Cl.
*G01V 1/52* (2006.01)
*G01V 1/42* (2006.01)
*G01V 1/20* (2006.01)
(Continued)

(52) U.S. Cl.
CPC ... *G01V 1/40* (2013.01); *G01V 1/42* (2013.01)

(58) Field of Classification Search
CPC ............ G01V 1/42; G01V 1/40; G01V 1/44; G01V 1/52; E21B 47/01; E21B 4/011; E21B 47/09

USPC ............ 181/102, 105, 110, 112, 122; 367/35, 367/154, 172
See application file for complete search history.

(56) References Cited

U.S. PATENT DOCUMENTS 4,894,807 A *   1/1990   Alam et al. ................... 367/15
6,971,265 B1 *   12/2005   Sheppard et al. .......... 73/152.54
(Continued)

OTHER PUBLICATIONS

Wong et al., "Cross-Hole Seismic Scanning and Tomography," TLE, Jan. 1987, 36-41.
(Continued)

*Primary Examiner* — Edgardo San Martin
(74) *Attorney, Agent, or Firm* — Daryl R. Wright; Jody DeStefanis

(57) ABSTRACT

Neutrally-buoyant tools for seismic data collection are provided that may range from several hundred meters to several kilometers in length and have integrated sensors which move along with the borehole fluid in response to a passing seismic wave. The disclosure also provides methods of deploying neutrally-buoyant tools, which includes using a tractor, adding a weight or both to the tool in order to overcome the difficulty of lowering a neutrally buoyant tool into a borehole, and optionally occasionally clamping the tool to the borehole to alleviate tension in the tool. This disclosure also provides methods of acquiring seismic data, which involves positioning a neutrally-buoyant tool in a borehole such that the tool is able to move relatively freely along with the borehole fluid in response to a seismic wave passing through the fluid, firing a seismic source, and using the sensors to collect seismic data generated thereby.

20 Claims, 4 Drawing Sheets

(51) Int. Cl.
*G01V 1/40* (2006.01)
*G01V 1/16* (2006.01)

(56) References Cited

U.S. PATENT DOCUMENTS

| | | | | |
|---|---|---|---|---|
| 7,048,089 | B2 * | 5/2006 | West et al. | 181/105 |
| 7,178,627 | B2 | 2/2007 | West et al. | |
| 7,814,973 | B2 * | 10/2010 | Dusterhoft et al. | 166/227 |
| 7,881,159 | B2 * | 2/2011 | Hegna et al. | 367/173 |
| 7,926,614 | B2 * | 4/2011 | Tenghamn et al. | 181/121 |
| 2008/0316860 | A1 | 12/2008 | Muyzert et al. | |
| 2009/0092006 | A1 | 4/2009 | Teigen et al. | |
| 2009/0323468 | A1 * | 12/2009 | Teigen | 367/20 |
| 2010/0039889 | A1 * | 2/2010 | Teigen et al. | 367/20 |
| 2011/0222368 | A1 * | 9/2011 | Fussell | 367/25 |
| 2011/0273957 | A1 * | 11/2011 | Guizelin et al. | 367/20 |
| 2012/0176859 | A1 * | 7/2012 | Pabon et al. | 367/20 |
| 2013/0343157 | A1 * | 12/2013 | Goujon et al. | 367/25 |

OTHER PUBLICATIONS

Marzetta et al., "A Hydrophone Vertical Seismic Profiling Experiment," Geophysics, 1988, 53 (11) 1437-1444.

Kragh et al., "Anisotropic Traveltime Tomography in a Hard-Rock Environment," First Break, 1995, 14, 10, 391-397.

Kitsunezaki, "A New Method for Shear-Wave Logging," GeoPhysics, vol. 45, No. 10, Oct. 1980, p. 1489-1506.

Schlumberger Versatile Seismic Imager (VSI), "Efficient Acquisition of Quality Borehole Seismic" http://www.slb.com/~/media/Files/seismic/brochures/vsi.ashx, Sep. 2002.

Paulsson, Inc. "Acquisition Services," at http://www.paulsson.com/service3.html, 2009.

International Search Report for the equivalent PCT patent application No. PCT/US2013/046476 issued on Sep. 27, 2013.

* cited by examiner

NEUTRALLY-BUOYANT BOREHOLE INVESTIGATION TOOLS AND METHODS

FIELD

The present disclosure relates to the study of underground formations and structures, for example as it relates to oil and gas exploration. The present disclosure also relates to seismic surveying of subterranean geological formations.

BACKGROUND

Borehole seismic survey systems may involve sources located at the surface and receivers placed in the well. Other configurations are possible, for example the drill bit can function as the seismic source and receivers can be placed at the surface. No matter the configuration, noise can be generated in application, which can impact the accuracy of seismic analysis.

Borehole seismic acquisition systems can be configured to avoid noise, for example by spacing sensors according to signal sampling requirements and by isolating sensors using mechanical design principles. For example, in borehole seismic acquisition, the downhole tool may include an array (or multi-level in depth) of individual acquisition nodes or sondes. At each depth level, these sondes can be designed to try to maximize their geophysical coupling response to the surrounding formation by mechanical, magnetic or hydraulic clamping devices. Clamping sondes to the formation may also minimize the recording of geophysical noise, e.g. the tube wave energy in a borehole. Because such devices may record the seismic response in the surrounding formation (the geophysical signal) the depth interval between measuring points or sondes can be defined by the seismic signal processing requirements. This may be on the order of a few meters. For example, the Schlumberger Versatile Seismic Imager (VSI)[1] tool uses a 15 m separation with up to 40 separate nodes, and the Paulsson Inc. 100-level array tool (Paulsson) also has a standard "pod" separation of 15 m. Both these tools are based on individual clamped units containing three-component geophones/accelerometers.

[1] Versatile Seismic Imager (VSI) is a trademark of Schlumberger.

Clamping devices use power and are relatively heavy and so this may limit the number of measuring points and therefore the total length of the tool. In order to cover a larger depth aperture in the borehole, or to sample the depth interval more finely, the complete borehole tool should be moved to a different depth and the seismic experiment repeated. Clamping devices can also become stuck or jammed, increasing the risk of not being able to retrieve the tool from the borehole.

Alternative systems have been proposed and used in the past. U.S. Pat. Pub. No. 2008/0316860, which is herein incorporated by reference in its entirety, describes a borehole acquisition system (a single length of 'streamer') that contains hydrophones only. However, the system uses densely sampled groups of hydrophones to estimate gradients of the wavefield directly from the hydrophone measurements. The distance (depth interval) between these groups of hydrophones is governed by the signal sampling requirements.

Borehole streamers containing only hydrophones have been used to acquire both vertical seismic profiling ("VSP") and cross-well seismic surveys (see for example, Wong et al., TLE, January 1987, 36-41; Marzetta et al., A Hydrophone Vertical Seismic Profiling Experiment, Geophysics, 1988, 53 (11) 1437-1444; Kragh et al., Anisotropic Traveltime Tomography in a Hard-Rock Environment, First Break, 1995, 14, 10, 391-397). Although these systems were designed for borehole environments they appear to have limited overall length (32 channels, 12 channels and 16 channels, respectively). The hydrophone spacing in these tools is a few meters, with the exception of Marzetta et al. (1988), which use a 1.5 m hydrophone spacing to avoid the tube wave noise, and 8 separate downhole positions to cover the aperture. These systems appear to not contain elastic wavefield measuring devices.

Kitsunezaki (GeoPhysics, Vol. 45, No 10, October 1980, p. 1489-1506, "A New Method for Shear-Wave Logging") proposes a suspension-type detector for measuring shear waves, i.e. a sensor integrated into a conventional tool configured to result in a locally decoupled neutrally buoyant particle motion sensor. Kitsunezaki fails to address how noise may be handled and resolved.

SUMMARY

The present disclosure provides downhole apparatus for seismic surveying, and methods of deploying and using the downhole apparatus for acquiring seismic data downhole.

In some embodiments, the apparatus is a length of cable having at least one sensor mounted on or within the cable, where the apparatus is substantially neutrally buoyant in the borehole fluid. Although the apparatus may be used in shallow boreholes, for example boreholes having a length of about 100 m or less, and the cable may have a length of about 100 m or less, in some embodiments, the length of the cable is at least about 300 m in length. In some embodiments, the length of the cable ranges from about 300 m to about several kilometers in length. In some embodiments, the cable has a length of about 1 km or more.

In some embodiments, the cable has at least one of: a homogenous density, a homogenous mass, and a homogenous stiffness. In some embodiments, the cable has a homogenous density, homogeneous mass, and homogenous stiffness. In some embodiments, at least one of the density, mass and stiffness of the cable may vary along the length of the cable to achieve an apparatus that matches the density of the borehole fluid all along the length of the cable. In some embodiments, the density, mass and stiffness of the cable all vary along the length of the cable to achieve an apparatus that matches the density of the borehole fluid all along the length of the cable.

In some embodiments, the at least one sensor is at least one particle motion sensor, at least one pressure sensor or both. In some embodiments, the at least one particle motion sensor is at least one MEMS accelerometer such as 3C MEMS geophone.

In some embodiments, the method of deploying the apparatus in the borehole includes positioning the neutrally-buoyant apparatus in the borehole such that the at least one sensor is free to move with the borehole fluid when a seismic wave passes through the borehole fluid. In some embodiments, positioning the neutrally-buoyant apparatus includes mounting at least one of a weight or a tractor to the cable to assist in lowering the cable into the borehole, unreeling the cable from a spool above the borehole, and optionally clamping the cable to the borehole as needed to remove or alleviate tension in the cable. In some embodiments, the method includes iteratively clamping and reeling sections of cable as the apparatus is lowered into the borehole only as needed to relieve tension. For example, when the clamped section of cable is no longer under stretch, another clamp is deployed and additional cable may be reeled into the borehole until the newly reeled section is no longer under stretch.

In some embodiments, the method of acquiring seismic data includes: lowering a neutrally-buoyant apparatus including at least one seismic sensor into a borehole, where the neutrally-buoyant apparatus is positioned within the borehole such that the at least one seismic sensor may move relatively freely with the borehole fluid when a seismic wave passes through the borehole fluid; firing a seismic source; and using the at least one seismic sensor to gather data relating to seismic waves passing through the borehole fluid as a result of firing the seismic source.

The identified embodiments are exemplary only and are therefore non-limiting. The details of one or more non-limiting embodiments of the invention are set forth in the accompanying drawings and the descriptions below. Other embodiments of the invention should be apparent to those of ordinary skill in the art after consideration of the present disclosure.

DETAILED DESCRIPTION

Unless defined otherwise, all technical and scientific terms used herein have the same meaning as is commonly understood by one of ordinary skill in the art to which this disclosure belongs. In the event that there is a plurality of definitions for a term herein, those in this section prevail unless stated otherwise.

Where ever the phrases "for example," "such as," "including" and the like are used herein, the phrase "and without limitation" is understood to follow unless explicitly stated otherwise. Therefore, "for example a downhole seismic tool" means "for example and without limitation a downhole seismic tool."

The terms "comprising" and "including" and "involving" and "having" (and similarly "comprises" and "includes" and "involves" and "has") are used interchangeably and mean the same thing. Specifically, each of the terms is defined consistent with the common United States patent law definition of "comprising" and is therefore interpreted to be an open term meaning "at least the following" and also interpreted not to exclude additional features, limitations, aspects, etc.

The terms "about" or "substantially"/"relatively" are meant to account for variations due to experimental error, or alternatively to permit deviations from the measured quantity or descriptor that don't negatively impact the intended purpose. All measurements or numbers are implicitly understood to be modified by the word about, even if the measurement or number is not explicitly modified by the word about. Similarly, all descriptive terms are implicitly understood to be modified by the word substantially/relatively, even if the descriptive term is not explicitly modified by the word substantially/relatively.

The terms "wellbore" and "borehole" are used interchangeably.

There are two general approaches to measuring seismic waves. On the one hand, seismic waves can be measured with particle motions sensors, which sense particle motion associated with a passing seismic wave. Particle motion sensors include accelerometers, for example MEMS accelerometers, and velocity sensors such as moving coil geophones. These sensor types are directional, and consequently three orthogonally mounted sensors are generally used to obtain the full vectorial representation of the signal. Because particle motion in the formation can be approximated by particle motion of the borehole wall, particle motion sensors are traditionally clamped to the borehole wall. On the other hand, seismic waves can also be measured with pressure sensors, which sense pressure variations associated with wave propagation. Pressure sensors include for example hydrophones. These sensor types provide a scalar measurement, which individually have no directionality information. Other limitations which may be associated with hydrophones include that some seismic waves, such as shear waves, have no pressure variation associated with their propagation.

Figure 1A:
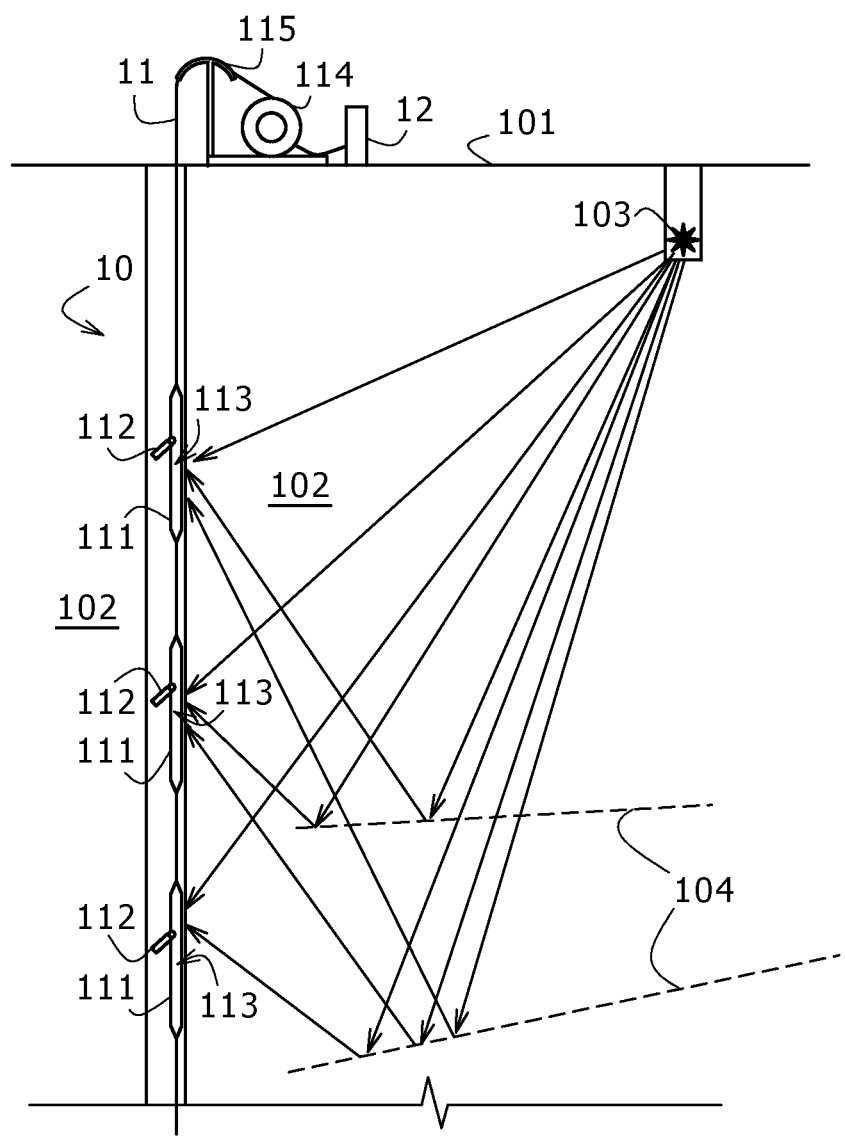
FIG. 1A is a schematic illustration of a vertical seismic profiling operation.

A vertical seismic acquisition set up in a borehole is illustrated in FIG. 1A. A cable 11 carrying a plurality of VSP geophones 111 is suspended from the surface 101 into the borehole 10. System noise is alleviated or avoided by pushing or wedging the geophones 111 against the formation 102 or any casing surrounding the wellbore 10 using a clamping or locking mechanism 112.

The clamping or locking mechanism 112 can be based on the use of springs, telescopic rams or pivoting arms as shown. The geophones 111 can carry transducer elements 113 to measure the velocity or acceleration in one of three independent directions. The clamping mechanism 112 ensures that the transducers 113 are coupled to the borehole wall. In a VSP operation, a decrease in the signal-to-noise ratio can be observed when the geophone loses contact with the wall of the borehole.

A cable reel 114 and feed 115 supports the cable 11 on the surface 101. Measurement signals or data are transmitted through the cable 11 to a base station 12 on the surface 101 for further processing. The cable 11 can be an armored cable as used for wireline operations with a plurality of wire strands running through its center.

In operation, a source 103 as shown is activated generating waves of seismic energies, which travel through the formation 102. Where the formation changes its impedance (as indicated by dashed lines 104), part of the seismic energy is either reflected or refracted. The geophones 111 register movements of the earth and the measurements are transmitted directly or after in-line digitization and/or signal processing to the surface base station 12 for storage, transmission and/or further processing. The subsequent data processing steps are known and well established in the field of hydrocarbon exploration and production.

Figure 1B:
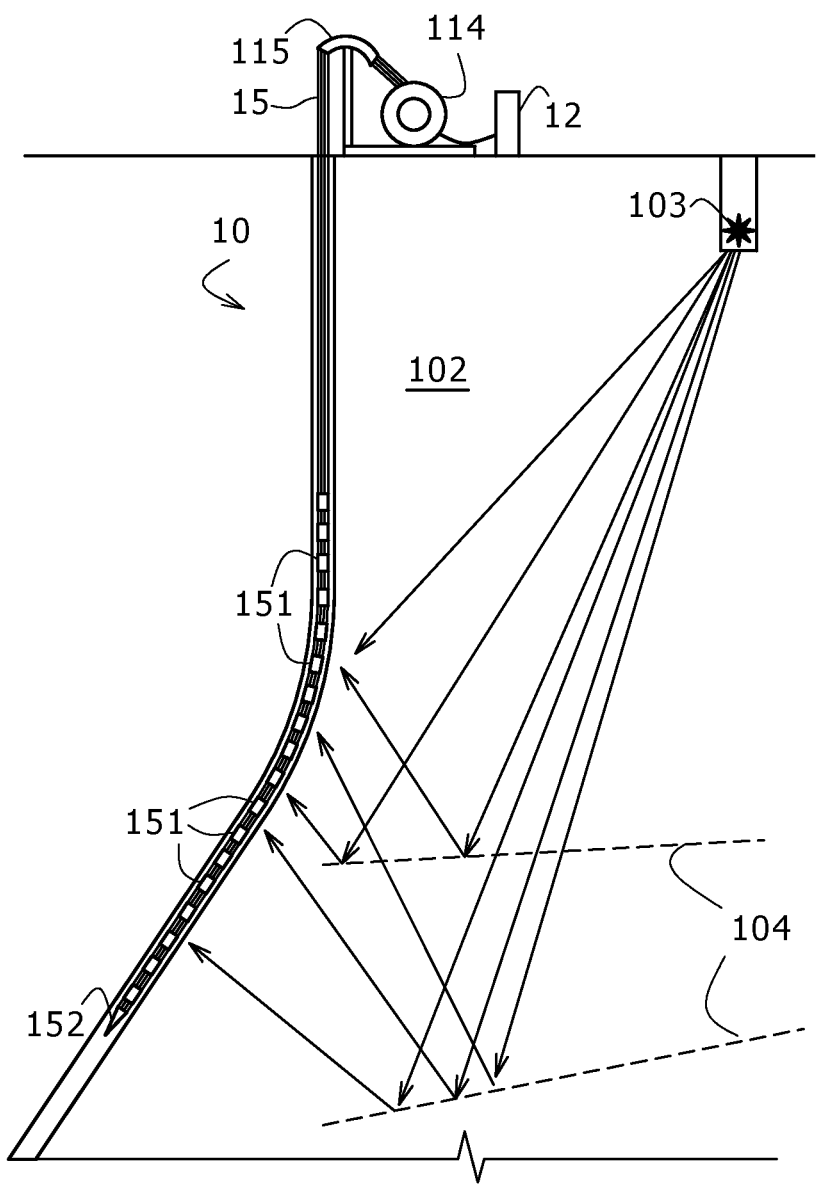
FIG. 1B is a schematic illustration of another vertical seismic profiling operation.

FIG. 1B illustrates a seismic apparatus similar to that of FIG. 1A except the geophone-carrying cable 11 of FIG. 1A is replaced by a cable 15 having a plurality of internal mounts 151 to each accommodate at least two hydrophones. Such an apparatus is described in U.S. Pat. Pub. No. 2008/0316860 ("the '860 publication"), which as previously stated is herein incorporated by reference in its entirety. The cable 15 (hereinafter "borehole seismic cable" or "streamer") has the appearance of a streamer as used in marine seismic acquisitions in that the hull or outer layer of the cable forms the outer layer or hull of the receivers. The '860 publication describes various configurations of the densely sampled groups of hydrophones to estimate gradients of the wavefield directly from the hydrophone measurements. The distance (depth interval) between these groups of hydrophones is governed by the signal sampling requirements.

Figure 2A:
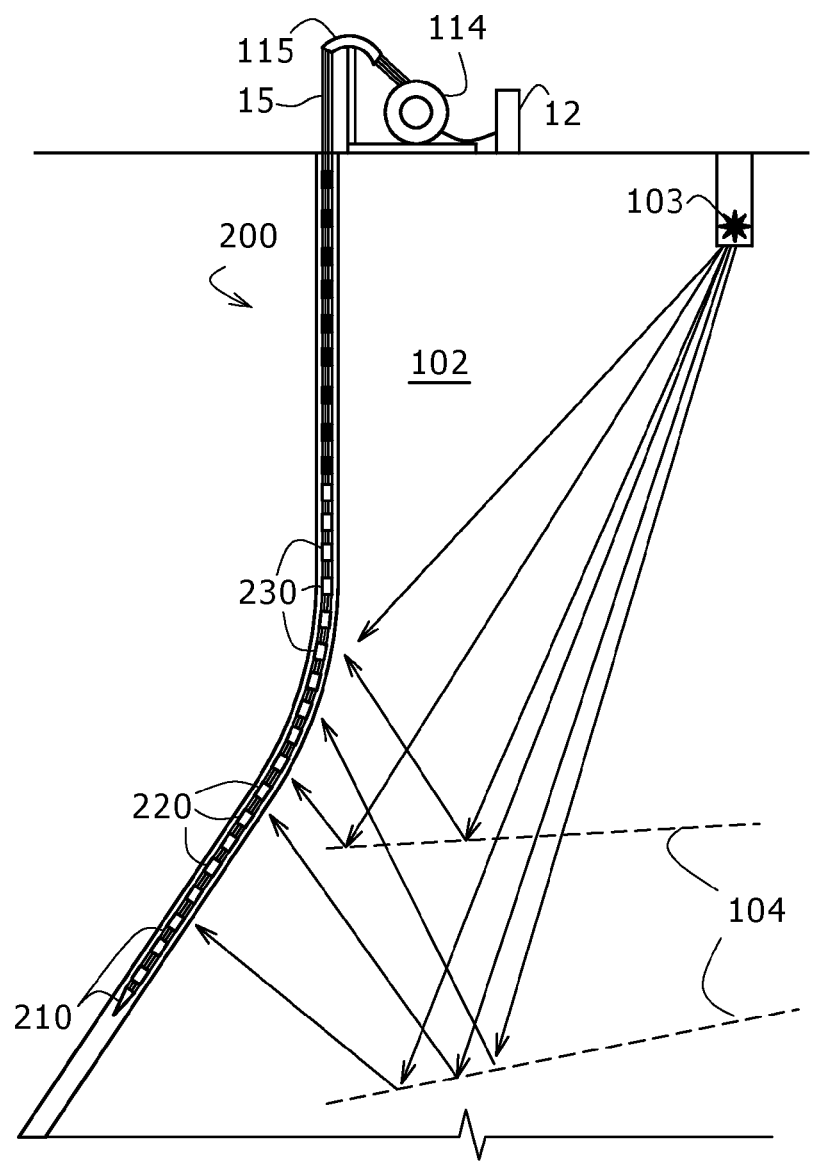
FIG. 2A is a schematic illustration of a vertical seismic profiling operation including a substantially neutrally-buoyant tool, using tools, apparatus and methods in accordance with an embodiment of the disclosure.
Figure 2B:
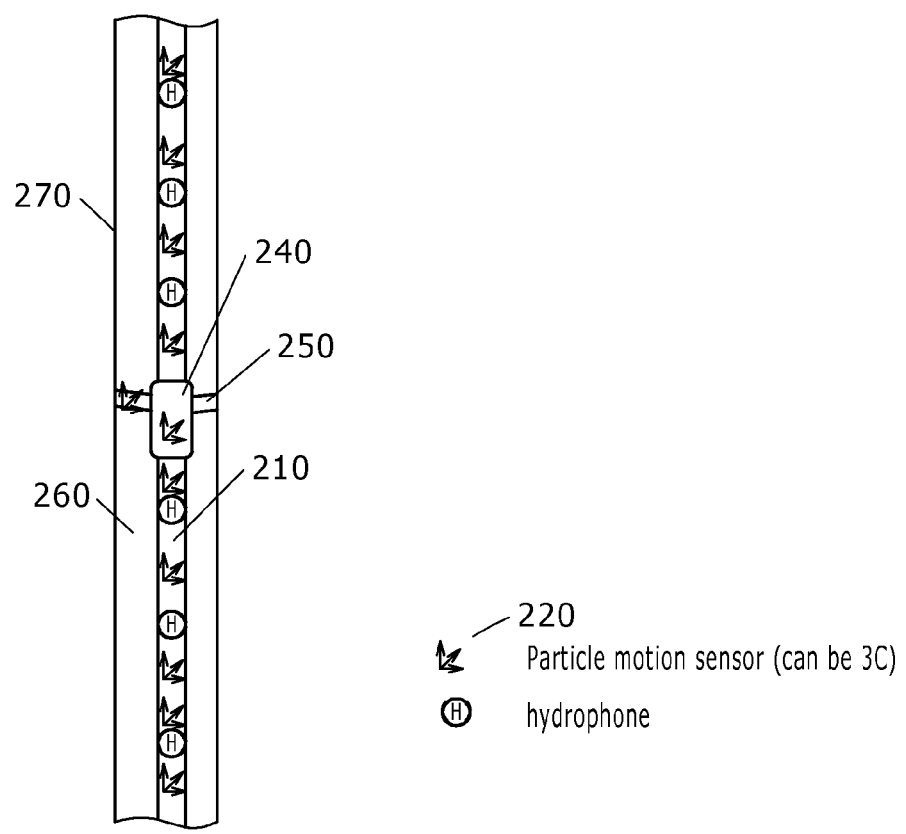
FIG. 2B is a close-up schematic illustration of a section of cable from the substantially neutrally-buoyant tool of FIG. 2A.

FIG. 2A illustrates a substantially neutrally-buoyant acquisition tool 200 in accordance with an embodiment of the present disclosure. The neutrally-buoyant tool 200 includes a cable 210 or section of cable 210 with integrated sensors, for example particle motion sensors 220 and hydrophones 230. As shown in more detail in FIG. 2B, three particle motion sensors 220 are mounted orthogonally with respect to one another at each depth in order to sample the full vectorial representation of the signal. The tool 200 optionally includes at least one electronic module 240 and at least one clamp 250.

A "neutrally-buoyant" tool is a tool that is substantially buoyant in the borehole fluid 260 such that the sensors follow the movements of the fluid in the borehole; when a seismic wave crosses the borehole, its wall 270 will move with the seismic wave as will the fluid 260 in the well. In some embodiments, the result is a tool that is much simpler, much faster to deploy, and much lighter than conventional tools requiring clamping. In some embodiments, for example where the density of the tool substantially matches the density of the fluid, the particle motion in the tool may be similar to the motion in a clamped device for components perpendicular to the axis of the borehole. In some embodiments, an axial pressure gradient derived from hydrophone data may be used to improve the estimate of axial particle motion in the formation, for example as described in the '860 publication referenced above.

In some embodiments, the cable 210 is up to several kilometers in length, for example from about 300 m to about 2 km, with embedded sensors and optional electronics. In some embodiments, the cable 210 is 1 km or greater in length. In some embodiments, the cable 210 is 100 m or less in length. For example, the cable 210 can be a reeled, spooled downhole cable, such as for example a streamer. For the avoidance of doubt, the neutrally-buoyant tool may be used in both shallow boreholes such as boreholes having a length of 100 m or less, and it may be used in deep boreholes, including boreholes having a length of up to several kilometers.

The measurements in shallow boreholes can be accomplished either by reeling out only a short segment of a longer cable or by using a short cable (for example one which matches the depth of the borehole). Similarly measurements of deep boreholes may be accomplished for example by moving a shorter length cable and taking iterative measurements until the cable covers the borehole length or for example by using a single cable having a length that is about the length of the borehole (or about the length to be measured).

In some embodiments, the cable 210 characteristics include at least one of substantially homogenous density, substantially homogenous mass (e.g. substantially constant diameter), and substantially homogenous stiffness. A person of ordinary skill can determine suitable density, mass and stiffness by reading this disclosure and bearing in mind the desire to achieve a substantially neutrally-buoyant cable where a seismic wave can be effectively measured (e.g. the components that are perpendicular to the axis of the borehole) without clamping a sensor to a borehole wall.

For example, if the density of the tool 200 varies along its length, its response to a seismic wave or any excitation may vary. Some parts may move with higher amplitude than others, creating bending of the tool, which may be the start of a vibration wave (noise) propagating along the tool. A substantially homogenous tool can avoid or alleviate the generation of this noise. Further, unhomogeneity can be an issue to faithfully recording the seismic signal. As other parts of the tool may not move with the seismic wave, the sensor should be mechanically decoupled from them, which may increase the complexity of the system. Also, a cable with substantially homogenous mass may enable avoiding or alleviating excitation and reflection of vibration waves in the cable/tool. And, the stiffness may relate to sensor spacing, such as higher stiffness for higher noise propagation allows sampling of vibration noise with larger sensor spacing.

In other words, in some embodiments, sensor spacing may be determined by conventional theory, which states that sensor sampling is proportional to the lowest velocity (v); the wavelength of the noise at frequency (f) is v/f, and at least 2 points per wavelength should be acquired to sample without aliasing. U.S. Pat. Pub. No. 2009/0092006, which is herein incorporated by reference in its entirety, explains the relationship between sensor sampling and bending stiffness for a towed-marine streamer and can be adapted for some embodiments according to the present disclosure.

In some embodiments, at least one of the characteristics of the cable (such as density, homogeneity, mass) may be varied along the length of the cable such that the tool matches the density of the borehole fluid all along its length.

In some embodiments, the density of the cable ranges from about 0.8 g/cc, or from about 0.9 g/cc, or from about 1 g/cc to about about 2 g/cc, or to about 1.8 g/cc, or to about 1.5 g/cc. In some embodiments, the mass of the cable ranges from about 0.25 kg, or from about 0.3 kg to about 5.7 kg, or to about 2 kg/m dry weight. In some embodiments, the diameter of the cable ranges from about 2 cm to about 6 cm, or to about 5 cm or to about 4 cm. In some embodiments, the stiffness of the cable ranges from about 50 Nm to about 500 Nm.

In some embodiments, a complete section of the neutrally-buoyant tool may act as an antenna for the signal, i.e. a sensor placed anywhere along the tool—without mechanical decoupling of the sensor—will substantially properly record the seismic signal (with respect to components perpendicular to the axis of the borehole), which may enable using a larger number of sensors than possible with conventional tools. In some embodiments, the neutrally-buoyant tool has a section length ranging from about 50 m to about several km and in each section length the spacing between sensors ranges from about 1 m to about 6.25 m.

In some embodiments, the cable may include optional fillers for pressure compensation or to maintain appropriate density. For example, the cable may be filled with gel or fluid to achieve at least one of pressure compensation and maintaining appropriate density. In some embodiments, the cable may also include a "soft" skin. For example, in some embodiments the optional fillers can be used to achieve a neutrally-buoyant tool with constant or close to constant (substantially constant) density and diameter, with a length up to several km, and which can be deployed at high pressure. In doing so, in some embodiments, the particle motion sensors and/or electronics components may be protected from the high pressure downhole, and should be mounted within a package withstanding the pressure. On the other hand, the hydrophones may be in contact with the pressure in the borehole.

In some embodiments, pressure housings in the downhole tool may be made of metal, for example titanium, which has a favorable strength to weight ratio and can be tubular. To withstand high pressure, the titanium housings may have a relatively thick wall, for example an outer to inner diameter ratio of about 1.6. In some embodiments, the density of such a package may be larger than the density of the borehole fluid. Because the pressure rating is governed by the ratio between the outer and inner diameter of the tubular housing for a given material, increasing the empty space within the housing diameter while keeping the same pressure rating should not result in a decrease of the housing average density. In some embodiments, the tool includes wires, for example for use in transmission of power and data, which also have a density larger than the borehole fluid. The tool may also include a stress member, which can be a Kevlar (aramid) rope.

In such cases, where construction of the tool may result in a higher density than the borehole fluid, optional fillers with low density may be added. For example, air pockets (empty space) can be used. In some embodiments a gel having low compressibility and low density (e.g. around 0.8 for a hydrocarbon-based gel) may be used to help achieve neutral buoyancy. In some embodiments the filler (e.g., gel) may not be isolated from the pressure in the well, and can be contained in a skin or jacket of the tool, for example made of a polyurethane tube ("soft"). The gel may surround the tubular pressure housings and wires. Such a construction may be pressure compensated because the outside pressure is not held outside the tool; the pressure in the gel is the same as the pressure in the borehole fluid. In some embodiments, the hydrophones may also be in the gel, within the jacket, and measure the seismic pressure waves.

In some embodiments, the tool may have a lighter, slim pressure housing (such as for example having about a 1 cm inner diameter), for example in combination with the use of a small sensor such as a MEMS accelerometer. In some embodiments, where the tool diameter is substantially constant, the diameter may be smaller, which may also provide space for gel around the pressure housing to control the local density.

The sensors 220 can be at least one of directional (particle motion) and scalar (pressure) measurement sensors. In some embodiments, the sensors include 3C MEMS accelerometers, which due to their low weight and size may be advantageous in achieving neutral buoyancy in a small volume. In some embodiments, the sensors alternatively or in addition include hydrophones. In some embodiments, the sensors alternatively or in addition include any sensor capable of detecting a seismic signal which is compatible with configuring a neutrally-buoyant tool. In some embodiments, the sensor(s) do not negatively impact neutral buoyancy. In some embodiments, the sensor(s) may negatively impact neutral buoyancy but, as discussed above, the negative impact may be alleviated by the use of materials such as gel to mount the sensor (e.g. gel mounted hydrophones). Alternatively, or in addition to the filler materials, devices such as clamps may be used to alleviate tension the weight of a sensor may create in the cable. In some embodiments, filler materials are used to achieve neutral buoyancy while clamps are used only at the location of heavy electronics modules/concentrators (for example every about 100 meters to about several 100 meters) as more fully discussed below.

The sensors 220 may be integrated into the cable. In some embodiments, the sensors may be integrated as described in the '860 patent publication referenced above. In some embodiments, directional sensors may be attached via a stretch membrane or jacket of the cable and they may be mounted in sets of three, in mutual orthogonal relation to one another. In some embodiments, pressure sensors, such as hydrophones, may be integrated into the cable with gel.

As previously discussed, in some embodiments, hydrophones or pairs of hydrophones are sufficiently densely spaced in addition to the particle motion sensors to enable measurement of the axial pressure gradient. Hydrophone spacing density can be as described in the '860 publication referenced above. In some embodiments, the density of sensor placement depends on the application, for example it may depend on how high is the recording frequency, with higher frequency resulting in shorter apparent wavelength for signal and noise and thus a denser spatial sampling. For cross-well seismic and microseismic, the maximum frequency can be above 2 kHz, while it may be 200 Hz or less for other applications. The aperture therefore will also depend on the application. In some embodiments, the spacing between each type of sensor ranges from about 1 m to about 6.25 m.

In some embodiments, the tool 200 may also include optional electronics 240 for collecting and/or analyzing sensor data. In some embodiments, the sensors in the cable are connected together via a network. The network can have a limited data bandwidth, resulting in a maximum level of sensors that can be connected to it (typically from about 100 to several hundred). The network may be controlled and powered from an electronic module/concentrator unit. There, the data collected from the sensors may either be transmitted to the surface, for example via a separate optical network, or stored. These modules/concentrator units can be relatively large, as they include a power supply, and may be needed at regular intervals along the cable if the total number of sensors becomes very large. The electronic boards and power supply may be within a pressure housing. As previously discussed, in some embodiments, the tool may include some clamps to alleviate the tension from the modules/concentrator units so as to make them neutrally buoyant (or substantially neutrally buoyant).

Tension in the tool may lead to vibration propagation along the tool. Neutral buoyancy can facilitate limiting tension in the tool, as the tool wet weight in the borehole is by definition close to zero. By comparison, a standard tool is much heavier than the fluid, resulting in its own weight causing tension in the cable. Nevertheless, in some embodiments, clamps 250 can be used to alleviate tension in the cable, which may be caused for example by addition of weights to assist in lowering the cable into the borehole. In some embodiments, the clamps are discrete clamped modules positioned every few hundreds of meters of neutrally buoyant tool section, or as needed to alleviate tension in the cable. For example, in some embodiments, clamps are used only at the location of weight or electronic modules/concentrators. Accordingly, the clamps are spaced apart at a distance of about 100 m to about a few 100 m (corresponding to the spacing of the electronic modules/concentrators).

In some embodiments, the ratio of sensors 220 to clamps 250 can be much higher than in conventional seismic acquisition tools (which have a ratio of about 1:1) because the clamps are positioned along the tool to release tension, for example to mitigate resulting noise in the cable, and not to secure each sensor to the borehole wall or casing. In some embodiments, the clamps provide weight for overcoming the difficulty of lowering a neutrally-buoyant tool into a borehole. In some embodiments, sensor(s) such as particle motion sensor(s) may be added in the clamps, for example to measure the particle motion of the borehole wall. In some embodiments, such sensor(s) can provide quality control of the measurement in the neutrally buoyant sections and can be used to calibrate the axial components derived from hydrophone gradients and neutrally buoyant axial geophones.

As a person of skill will appreciate, because the tool 200 is neutrally buoyant, in some embodiments weight (not shown) can be added to the cable to move the cable 210 through the borehole fluid. In addition or in the alternative, a tractor may be used to assist movement of the cable through the fluid. Weight may be located at or toward the bottom of the cable and/or may be distributed along the cable, for example such as in the form of clamps 250. The number, weight and spacing of weights may be chosen to overcome the difficulty of lowering a neutrally-buoyant device into the borehole while still enabling relatively accurate seismic measurements (e.g. measurements that are comparable in accuracy to clamped sensors) or such that the negative impact may be alleviated by use of occasional clamps to alleviate tension caused by weights, fillers or other methods to add buoyancy.

In operation, in some embodiments, a weight can be attached to the bottom of the cable 210 and the cable may be reeled out. In some embodiments, the method of deployment is designed with the goal of releasing tension along the cable. For example, if the cable is lowered with weight, it will be under tension (e.g. stretched). For example, if all clamps are released simultaneously, or even one after the other without reeling out more cable, the cable may be stretched after clamping with weights. Stretch in the cable may lead to more vibration noise propagation along the cable/tool. In some embodiments, the method involves first clamping the lower weight, then reeling some cable to make sure the cable above the bottom weight is no longer under stretch, then clamping the next weight above, followed by reeling out more cable. This procedure can be done in an iterative pattern. In this way, tension in the cable is alleviated, and in some embodiments, the entire cable will not be under tension, which is favorable for signal recording and noise attenuation. A tractor may also be used to assist in deploying the tool into the borehole.

A number of embodiments have been described. Nevertheless it will be understood that various modifications may be made without departing from the spirit and scope of the invention. Illustrative embodiments and aspects according to the disclosure are described below. It should of course be appreciated that in the development of any such actual embodiment, numerous implementation-specific decisions can be made to achieve the developers' specific goals, such as compliance with system-related or business-related constraints that may vary from one implementation to another. For example, although the tool has been described as a cable up to several kilometers in length including integrated sensors, any approach to implementing a tool which otherwise houses sensors and has substantially no relative movement relative to the surrounding fluid when excited by an acoustic wave (i.e. the sensor 'follows' the fluid movement) can be considered within the scope of this disclosure. Accordingly, other embodiments are included as part of the invention and may be encompassed by the attached claims. Furthermore, the foregoing description of various embodiments does not necessarily imply exclusion. For example, "some" embodiments or "other" embodiments may include all or part of "some", "other" and "further" embodiments within the scope of this invention.

What is claimed is:

1. An apparatus for borehole seismic surveying, comprising: a downhole seismic signal acquisition tool comprising a section of cable having a length of at least about 300 m or greater and at least one sensor for measuring seismic signals mounted on the cable, within the cable, or both, wherein the acquisition tool is substantially neutrally-buoyant in a borehole fluid.

2. An apparatus according to claim 1, further comprising at least one device chosen from a weight and a tractor, wherein the device is connected to the cable in a manner that provides assistance in lowering the cable into the borehole.

3. An apparatus according to claim 1, wherein the cable has at least one of a substantially homogenous density, a substantially homogenous mass, and a substantially homogenous stiffness.

4. An apparatus according to claim 1, wherein the at least one sensor is chosen from particle motion sensor, pressure sensor and combinations thereof.

5. An apparatus according to claim 4, wherein the particle motion sensor is 3C MEMS-based accelerometer.

6. An apparatus according to claim 1, wherein the acquisition tool further comprises an additive material for achieving neutral buoyancy.

7. An apparatus according to claim 6, wherein the additive material is a gel or a fluid or combinations thereof.

8. An apparatus according to claim 1, wherein the cable has a length of at least about 1 km.

9. An apparatus according to claim 1, wherein at least one of the density, mass and stiffness of the cable vary to achieve a cable that matches the density of the borehole fluid all along the length of the cable.

10. A method of acquiring seismic data downhole, comprising:
    lowering a substantially neutrally-buoyant tool into a borehole, wherein the substantially neutrally-buoyant tool comprises a section of cable at least about 300 m in length or greater and at least one sensor mounted on or within the cable or both, wherein lowering comprises mounting at least one of a weight or a tractor to the cable to assist in lowering the cable, and positioning the substantially neutrally-buoyant tool in the borehole such that the at least one sensor is substantially capable of moving along with a seismic wave that passes through the borehole fluid;
    firing a seismic source resulting in movement of the borehole fluid in response to a seismic wave; and
    acquiring data relating to the seismic wave using the at least one sensor which moves together with the borehole fluid.

11. A method according to claim 10, further comprising: clamping the cable to a borehole wall or casing to release or alleviate tension in the cable, caused by the weight or the tractor, as needed.

12. A method according to claim 11, wherein clamping comprises using at least one clamp spaced apart at a distance ranging from at least about 100 meters to about several 100 meters.

13. A method according to claim 12, wherein the at least one sensor is a number of sensors, and the at least one clamp is a number of clamps, and the number of sensors to the number of clamps is greater than 1:1.

14. A method according to claim 10, further comprising;
    using a section of the length of the acquisition tool as an antenna for the seismic signal.

15. An apparatus according to claim 1, further comprising;
    a hydrophone to measure axial pressure gradient for estimating axial particle motion.

16. A system for borehole for detecting seismic signals downhole, comprising:
    a downhole seismic signal acquisition tool comprising:
        a section of cable having a length of at least about 300 m or greater,
        a plurality of sensors for measuring seismic signals mounted on the cable, within the cable, or both; and
    a deployment device chosen from a weight or a tractor;
    wherein the acquisition tool is substantially neutrally-buoyant in a borehole fluid.

17. A system according to claim 16, further comprising:
    a clamp to secure a portion of the acquisition tool to the borehole to release or alleviate tension in the acquisition tool resulting from the deployment device.

18. A system according to claim 16, in which the plurality of sensors includes a particle motion sensor and a pressure sensor.

19. A system according to claim 16, in which the plurality of sensors includes sensor is 3C MEMS-based accelerometer.

20. A system according to claim 16, in which the acquisition tool has at least one of a substantially homogenous density, a substantially homogenous mass, or a substantially homogenous stiffness.

* * * * *